(12) United States Patent
Castaneda Zuniga et al.

(10) Patent No.: US 10,858,462 B2
(45) Date of Patent: Dec. 8, 2020

(54) ETHYLENE COPOLYMERS AND PROCESS FOR THE PRODUCTION THEREOF

(71) Applicant: SABIC GLOBAL TECHNOLOGIES B.V., Bergen op Zoom (NL)

(72) Inventors: Diego Mauricio Castaneda Zuniga, Maastricht (NL); Carolina de los Angeles Toloza Porras, Maastricht (NL); Peter Neuteboom, Hoensbroek (NL); Jan Nicolaas Eddy Duchateau, Paal (BE); Jerome Vachon, Geleen (NL); Franciscus Petrus Hermanus Schreurs, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 170 days.

(21) Appl. No.: 16/062,184

(22) PCT Filed: Dec. 7, 2016

(86) PCT No.: PCT/EP2016/080105
§ 371 (c)(1),
(2) Date: Jun. 14, 2018

(87) PCT Pub. No.: WO2017/102506
PCT Pub. Date: Jun. 22, 2017

(65) Prior Publication Data
US 2018/0371130 A1    Dec. 27, 2018

(30) Foreign Application Priority Data
Dec. 17, 2015  (EP) .................................. 15200734

(51) Int. Cl.
*C08F 220/20* (2006.01)
*C08F 210/02* (2006.01)
(Continued)

(52) U.S. Cl.
CPC .............. *C08F 210/14* (2013.01); *C08F 2/01* (2013.01); *C08F 216/1416* (2013.01); *C08F 220/20* (2013.01); *C08F 220/26* (2013.01); *C08J 5/18* (2013.01); *C08K 5/14* (2013.01); *C08K 5/23* (2013.01); *C08F 220/281* (2020.02); *C08F 2500/12* (2013.01); *C08F 2500/26* (2013.01);
(Continued)

(58) Field of Classification Search
CPC .... C08F 210/02; C08F 220/20; C08F 216/12; C08F 216/1416; C08F 216/1433; C08F 216/1441; C08F 216/145; C08F 220/285; C08F 220/286; C08F 220/287; C08F 220/288
See application file for complete search history.

(56) References Cited

U.S. PATENT DOCUMENTS 3,300,452 A * 1/1967 Waples, Jr. ............... C08F 2/48
526/320
4,038,264 A  7/1977 Rostoker et al.
(Continued)

FOREIGN PATENT DOCUMENTS

| EP | 538033 A1 * | 4/1993 | ............ C08F 210/02 |
|---|---|---|---|
| EP | 0538033 A1 | 4/1993 | |
| GB | 1000330 * | 8/1965 | |
| GB | 1000330 A | 8/1965 | |
| GB | 2030996 A | 4/1980 | |
| WO | 2006094723 A1 | 9/2006 | |
| WO | 2015150215 A1 | 10/2015 | |

OTHER PUBLICATIONS

International Search Report for International Application No. PCT/EP2016/080105; International Filing Date: Dec. 7, 2016; dated Mar. 6, 2017; 5 Pages.
Written Opinion of the International Searching Authority for International Application No. PCT/EP2016/080105; International Filing Date: Dec. 7, 2016; dated Mar. 6, 2017; 6 Pages.

*Primary Examiner* — Rip A Lee
(74) *Attorney, Agent, or Firm* — Cantor Colburn LLP

(57) ABSTRACT

The present invention relates to an ethylene copolymer comprising: (iv) ≥78.0 and ≤99.9 mol % of recurring units derived from ethylene; (v) ≥0.10 and ≤20.0 mol % of a recurring units derived from a comonomer A according to formula (I) wherein R1 is a moiety comprising 1-30 carbon atoms; R2 is selected from —H or —CH$_3$; R3 is selected from —O—, —(CO)—(NH)— or —(CO)—O—; n=0 or 1; and m≥1 and ≤10; and (vi) ≥0.01 and ≤2.00 mol % of a recurring units derived from a comonomer B according to formula (II) wherein R1 is a moiety comprising 1-30 carbon atoms; each R2 may individually be selected from —H or —CH$_3$; each of R3 is individually selected from —O—, —(CO)—(NH)— or —(CO)—O—; n=0 or 1; p=0 or 1; and m≥1 and ≤10; the mol % of each of (i), (ii) and (iii) being related to the sum of the mol % of (i), (ii) and (iii), the sum of the mol % of (i), (ii) and (iii) adding up to 100 mol %. Such ethylene copolymers have a reduced peak melting temperature and reduced enthalpy of fusion, indicating that these ethylene copolymers have a reduced degree of crystallinity and improved clarity and contact angle, combined with a desired melt mass-flow rate.

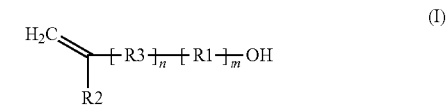

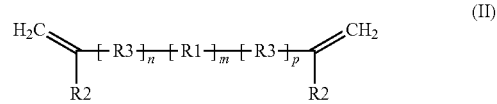

18 Claims, No Drawings

(51) Int. Cl.
    *C08F 210/14*     (2006.01)
    *C08J 5/18*     (2006.01)
    *C08F 2/01*     (2006.01)
    *C08F 216/14*     (2006.01)
    *C08F 220/26*     (2006.01)
    *C08K 5/14*     (2006.01)
    *C08K 5/23*     (2006.01)
    *C08F 220/28*     (2006.01)

(52) U.S. Cl.
    CPC ....... *C08F 2800/10* (2013.01); *C08J 2323/08* (2013.01)

(56) References Cited

U.S. PATENT DOCUMENTS

| | | | |
|---|---|---|---|
| 5,959,055 A * | 9/1999 | Le Blevec | C08F 210/02 526/318.42 |
| 6,165,387 A | 12/2000 | Gustafsson et al. | |
| 6,265,493 B1 * | 7/2001 | Chung | C08F 10/00 525/184 |
| 6,268,442 B1 | 7/2001 | Gustafsson et al. | |
| 6,384,170 B1 * | 5/2002 | Krull | C08F 10/02 526/348 |
| 7,820,776 B2 * | 10/2010 | Neuteboom | C08J 5/18 526/323.2 |
| 9,238,700 B2 | 1/2016 | Littmann et al. | |
| 9,771,445 B2 * | 9/2017 | Van Bodegom | C08F 210/02 |
| 2015/0197590 A1 | 7/2015 | Osby | |

* cited by examiner

ETHYLENE COPOLYMERS AND PROCESS FOR THE PRODUCTION THEREOF

CROSS REFERENCE TO RELATED APPLICATIONS

This application is a 371 of International Application No. PCT/EP2016/080105, filed Dec. 7, 2016, which claims priority to European Application Serial No. 15200734.0 filed Dec. 17, 2015, which are incorporated herein by reference in their entirety.

The present invention relates to ethylene copolymers. The invention further relates to a process for the production of such ethylene copolymers in a tubular reactor.

Ethylene copolymers are materials that offer a spectrum of material properties rendering them suitable for a wide variety of applications. Such applications include films, foams, adhesive solutions, wire and cable coatings and coating films.

In film applications, the ethylene copolymers may be used to form single-layer films or to form one or more layers of multi-layer films. Ethylene copolymers may be used in several layers of such multi-layer films, such as for example as intermediate layers, where the ethylene copolymer amongst others has an adhesive function to bind the layers on either side, or as surface layers. In such applications, it is desirable that the materials of which the layers are produced may be thermally welded and have high transparency.

A further field of application where ethylene copolymers find their use is in coating films, also referred to as extrusion coatings. In such extrusion coating processes, a coating of ethylene copolymer may be formed onto a substrate material by applying a quantity of molten ethylene copolymer onto one or more of the surface layers of the substrate material by means of melt extrusion of the ethylene copolymer onto the substrate surface. Suitable substrate materials that may be subjected to extrusion coating with ethylene copolymers include paper, paperboard, metal foils such as aluminium foils, and polymeric films.

To be suitable for use in such applications, ethylene copolymers need to provide a certain combination of properties. It is in particular desirable for use in such applications that ethylene copolymers have a low melting temperature. A low melting temperature allows for processing at comparatively low processing temperatures, which results in energy saving during the processing of the ethylene copolymers.

Furthermore, it is desirable that the ethylene copolymers have a low degree of crystallinity. A low degree of crystallinity is understood to contribute to amongst others good optical properties and surface properties. An optical property that is particularly relevant is clarity. Having high clarity is in many applications desirable as it allows for applying the ethylene copolymers in applications where transparency of the polymer layer is required. A surface property that is particularly relevant is the contact angle. Ethylene copolymers that have a low contact angle have good adhesive properties. Good adhesive properties are particularly desirable for extrusion coating applications, film applications and in adhesive solutions.

Furthermore, it is particularly desirable that the ethylene copolymers have good melt processability, indicated by for example a certain melt mass-flow rate.

There is a clear need for ethylene copolymers that provide a balance of a low melting temperature, a low degree of crystallinity and good adhesive properties at a desired melt mass-flow rate.

This object has now been achieved according to the present invention by an ethylene copolymer comprising:
(i) ≥78.0 and ≤99.9 mol % of recurring units derived from ethylene;
(ii) ≥0.10 and ≤20.0 mol % of a recurring units derived from a comonomer A according to formula (I):

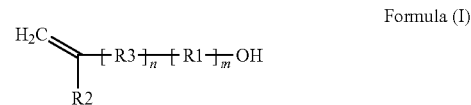

Formula (I)

wherein
R1 is a moiety comprising 1-30 carbon atoms;
R2 is selected from —H or —CH$_3$;
R3 is selected from —O—, —(CO)—(NH)— or —(CO)—O—;
n=0 or 1; and m≥1 and ≤10; and
(iii) ≥0.01 and ≤2.00 mol % of a recurring units derived from a comonomer B according to formula (II):

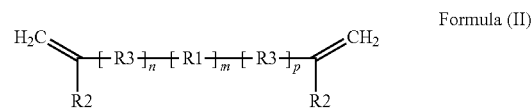

Formula (II)

wherein
R1 is a moiety comprising 1-30 carbon atoms;
each R2 may individually be selected from —H or —CH$_3$;
each of R3 is individually selected from —O—, —(CO)—(NH)— or —(CO)—O—;
n=0 or 1; p=0 or 1; and m≥1 and ≤10;
the mol % of each of (i), (ii) and (iii) being related to the sum of the mol % of (i), (ii) and (iii), the sum of the mol % of (i), (ii) and (iii) adding up to 100 mol %.

Such ethylene copolymers have a low melting temperature, a low crystallinity and good adhesive properties, combined with a low melt-mass flow rate. In the present context, the enthalpy of fusion is used as indicator for crystallinity; a reduction of the enthalpy of fusion is to be understood to reflect a reduction of the degree of crystallinity.

It is preferred that R1 in formula (I) is a moiety comprising 1-20 carbon atoms, more preferably comprising 1-10 carbon atoms. It is also preferred that R1 in formula (II) is a moiety comprising 1-20 carbon atoms, more preferably comprising 1-10 carbon atoms. It is further preferred that R1 in formula (I) is a moiety comprising 1-10 carbon atoms and R1 in formula (II) is a moiety comprising 1-10 carbon atoms.

The ethylene copolymer according to the present invention may for example comprise ≥0.10 and ≤20.0 mol %, preferably ≥0.50 and ≤10.0 mol %, more preferably ≥1.00 and ≤5.0 mol % of recurring units derived from comonomer A, the total mol % of recurring units derived from ethylene, comonomer A and comonomer B adding up to 100%.

The ethylene copolymer according to the present invention may for example comprise ≥0.01 and ≤2.00 mol %. Preferably this amount ≤1.00 mol % and more preferably ≤0.50 mol % of recurring units derived from comonomer B, the total mol % of recurring units derived from ethylene, comonomer A and comonomer B adding up to 100%.

More preferably, the ethylene copolymer according to the present invention comprises ≥0.50 and ≤10.0 mol % of recurring units derived from comonomer A and ≥0.01 and ≤1.00 mol % of recurring units derived from comonomer B, even more preferably ≥1.00 and ≤5.0 mol % of recurring units derived from comonomer A and ≥0.01 and ≤0.50 mol % of recurring units derived from comonomer B, the total mol % of recurring units derived from ethylene, comonomer A and comonomer B adding up to 100%.

The presence of such amounts of units derived from comonomer A and comonomer B is understood to contribute to the desired combination of low melting temperature and enthalpy of fusion, in combination with a desired melt mass-flow rate.

In a further preferred embodiment, the invention relates to an ethylene copolymer wherein:
in formula (I):
R1 is a moiety selected from the group consisting of:
—CH$_2$—;
—[CH$_2$]$_x$—CH(CH$_3$)—, wherein x≥1 and ≤10;
—CH$_2$—CHR4-[O—CH$_2$—CHR4]$_q$—, wherein q≥1 and ≤10, and each R4 individually is selected from CH$_3$ and H; and
—CH$_2$—CH(OH)—CH$_2$—; and
in formula (II):
R1 is a moiety selected from the group consisting of:
—CH$_2$—;
—[CH$_2$]$_x$—CH(CH$_3$)—, wherein x≥1 and ≤10;
—CH$_2$—CHR4-[O—CH$_2$—CHR4]$_q$—, wherein q≥1 and ≤10, and each R4 individually is selected from CH$_3$ and H; and
—CH$_2$—CH(OH)—CH$_2$.

Comonomer A may for example be a compound according to formula (III):

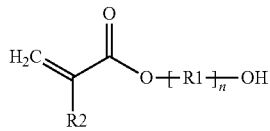

Formula (III)

wherein
R1 is a moiety selected from the group consisting of:
—CH$_2$—;
—[CH$_2$]$_x$—CH(CH$_3$)—, wherein x≥1 and ≤10;
—CH$_2$—CHR4-[O—CH$_2$—CHR4]$_q$—, wherein q≥1 and ≤10, and each R4 individually is selected from CH$_3$ and H; and
—CH$_2$—CH(OH)—CH$_2$—;
n≥1 and ≤10; and
R2 is selected from —H or —CH$_3$.

It is preferred that R1 in formula (III) is —CH$_2$— and n≥2 and ≤5. It is further preferred that R2 in formula (III) is —CH$_3$.

The presence of such comonomer A in such quantities is believed to contribute to the adhesive properties of the ethylene copolymer.

Comonomer B may for example be a compound according to formula (IV):

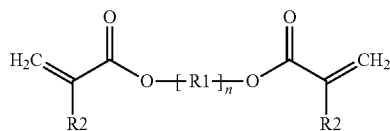

Formula (IV)

wherein
R1 is a moiety selected from the group consisting of:
—CH$_2$—;
—[CH$_2$]$_x$—CH(CH$_3$)—, wherein x≥1 and ≤10;
—CH$_2$—CHR4-[O—CH$_2$—CHR4]$_q$—, wherein q≥1 and ≤10, and each R4 individually is selected from CH$_3$ and H; and
—CH$_2$—CH(OH)—CH$_2$—;
n≥1 and ≤10; and
each R2 may individually be selected from —H or —CH$_3$.

It is preferred that R1 in formula (IV) is —CH$_2$— and n≥2 and ≤5. It is further preferred that R2 in formula (IV) is —CH$_3$.

In a preferred embodiment of the invention, the molar ratio of the recurring units in the ethylene copolymer derived from comonomer A to the recurring units derived from comonomer B is ≥10 and ≤100, more preferably ≥20 and ≤90, even more preferably ≥40 and ≤80.

The presence of recurring units derived from comonomer A is such ratio to recurring units derived from comonomer B provides an optimal balance of low melt mass-flow rate and low enthalpy of fusion.

The quantity of recurring units derived from ethylene, comonomer A and comonomer B in an ethylene copolymer according to the invention may for example be determined by nucleated magnetic resonance spectroscopy (NMR method) to obtain the $^1$H-NMR and the $^{13}$C-NMR spectra.

The comonomer A may for example be a compound selected from the list consisting of 2-hydroxyethyl acrylate, 2-hydroxyethyl methacrylate, 3-hydroxypropyl acrylate, 3-hydroxypropyl methacrylate, 2-hydroxypropyl acrylate, 2-hydroxypropyl methacrylate, 2,3-dihydroxypropyl acrylate, 2,3-dihydroxypropyl methacrylate, 4-hydroxybutyl acrylate, 4-hydroxybutyl methacrylate, poly(propylene glycol) monoacrylate, poly(propyleneglycol) monomethacrylate, poly(ethylene glycol) monoacrylate, poly(ethylene glycol) monomethacrylate, poly(ethylenepropyleneglycol) monomethacrylate and 2-hydroxyethyl vinyl ether.

Preferably, the comonomer A is selected from 2-hydroxyethyl acrylate, 2-hydroxyethyl methacrylate, 3-hydroxypropyl acrylate, 3-hydroxypropyl methacrylate, 2-hydroxypropyl acrylate, 2-hydroxypropyl methacrylate, poly(propylene glycol) monoacrylate, poly(propyleneglycol) monomethacrylate, poly(ethylene glycol) monoacrylate, and poly(ethylene glycol) monomethacrylate. Even more preferably, the comonomer A is selected from 2-hydroxyethyl methacrylate, 2-hydroxypropyl methacrylate, poly(propyleneglycol) monomethacrylate and poly(ethylene glycol) monomethacrylate. Comonomer A may for example be 2-hydroxyethyl methacrylate or 2-hydroxypropyl methacrylate. Alternatively, comonomer A may for example be poly(propyleneglycol) monomethacrylate or poly(ethylene glycol) monomethacrylate.

The comonomer B may for example be a compound selected from the list consisting of 1,4-butanediol dimethacrylate, hexanediol dimethacrylate, ethylene glycol dimethacrylate, 1,3-butylene glycol dimethacrylate, dodecanediol dimethacrylate, glycerol dimethacrylate, 1,4-butanediol diacrylate, hexanediol diacrylate, ethylene glycol diacrylate, 1,3-butylene glycol diacrylate, dodecanediol diacrylate, glycerol diacrylate, glycerol 1,3-diglycerolate diacrylate, glycerol 1,3-diglycerolate dimethacrylate, poly(ethylene glycol) dimethacrylate, poly(propylene glycol) dimethacrylate, poly(ethylenepropyleneglycol) dimethacrylate, trimethylol propane trimethacrylate, trimethylol propane triacrylate, 1,4-butanediol divinyl ether, poly(ethylene glycol)

divinyl ether, di(ethyleneglycol) divinyl ether, 1,5-hexadiene, 1,7-octadiene, 1,9-decadiene and 1,13-tetradecadiene.

Preferably, the comonomer B is selected from 1,4-butanediol dimethacrylate, poly(ethylene glycol) dimethacrylate and poly(propylene glycol) dimethacrylate.

It is further preferred that the ethylene copolymer comprises:
(i) ≥78.0 and ≤99.9 mol % of recurring units derived from ethylene;
(ii) ≥0.10 and ≤20.0 mol % of recurring units derived from comonomer A wherein comonomer A is selected from the list consisting of 2-hydroxyethyl acrylate, 2-hydroxyethyl methacrylate, 3-hydroxypropyl acrylate, 3-hydroxypropyl methacrylate, 2-hydroxypropyl acrylate, 2-hydroxypropyl methacrylate, poly(propyleneglycol) monomethacrylate, poly(ethylene glycol) acrylate, poly(ethylene glycol) methacrylate and poly(ethylenepropyleneglycol) monomethacrylate; and
(iii) ≥0.01 and ≤2.00 mol % of recurring units derived from comonomer B wherein comonomer B is selected from 1,4-butanediol dimethacrylate, hexanediol dimethacrylate, 1,3-butylene glycol dimethacrylate, dodecanediol dimethacrylate, glycerol dimethacrylate, 1,4-butanediol diacrylate, hexanediol diacrylate, 1,3-butylene glycol diacrylate, dodecanediol diacrylate, poly(ethylene glycol) dimethacrylate, poly(propylene glycol) dimethacrylate;

the mol % of each of (i), (ii) and (iii) being related to the sum of the mol % of (i), (ii) and (iii), the sum of the mol % of (i), (ii) and (iii) adding up to 100 mol %.

More preferably, the ethylene copolymer comprises (i) ≥78.0 and ≤99.9 mol % of recurring units derived from ethylene, (ii) 0.50 and ≤10.0 mol % of recurring units derived from comonomer A wherein comonomer A is selected from 2-hydroxyethyl methacrylate, 2-hydroxypropyl methacrylate, poly(propyleneglycol) monomethacrylate and poly(ethylene glycol) monomethacrylate, and (iii) ≥0.01 and ≤1.00 mol % of recurring units derived from comonomer B wherein comonomer B is selected from 1,4-butanediol dimethacrylate, poly(ethylene glycol) dimethacrylate and poly(propylene glycol) dimethacrylate, wherein the mol % of each of (i), (ii) and (iii) being related to the sum of the mol % of (i), (ii) and (iii), the sum of the mol % of (i), (ii) and (iii) adding up to 100 mol %.

The ethylene copolymer according to the present invention may for example have a melt mass-flow rate as determined in accordance with ISO 1133-1 (2011), at a temperature of 190° C. and a load of 2.16 kg, of ≥0.1 and ≤150.0 g/10 min, more preferably of ≥1.0 and ≤100.0 g/10 min, even more preferably of ≥5.0 and ≤50.0 g/10 min.

Ethylene copolymers having such melt-mass flow rate are suitable for films, foams, adhesive solutions, wire & cable coatings, and extrusion coatings.

The ethylene copolymer according to the present invention may for example have a peak melting temperature of ≤110° C., preferably ≤105° C., more preferably ≤100° C. The peak melting temperature is determined in accordance with ISO 11357-3 (2011). Ethylene copolymers having such peak melting temperature are desirable for applications such as extrusion coating or multi-layer films as the energy consumption required to process such polymers via melt processing is desirably low.

The ethylene copolymer according to the invention may for example have enthalpy of fusion of ≤120 J/g, preferably ≤110 J/g, more preferably ≤100 J/g. The enthalpy of fusion is determined in accordance with ISO 11357-3 (2011). Ethylene copolymers having such enthalpy of fusion have a low crystallinity, and a high clarity.

Preferably, the ethylene copolymer according to the present invention has a peak melting temperature as determined according to ISO 11357-3 (2011) of ≤110° C. and a enthalpy of fusion of the melting peak as determined according to ISO 11357-3 (2011) of ≤120 J/g.

Ethylene copolymers according to the invention preferably are produced in a high-pressure free-radical polymerisation process. An advantage of polymerisation in such high-pressure free-radical process is that the polymerisation may be performed without the need for a catalyst being present. This allows for the use of certain comonomers such as polar comonomers which are not suitable as comonomers in the production of ethylene copolymers via catalytic processes such as using Ziegler-Natta type catalysts because of the interference with such catalyst.

A further advantage of preparation of the ethylene copolymers according to the invention in a high-pressure free-radical polymerisation process is that such polymerisation results in ethylene copolymers having a certain degree of long-chain branching. In order to qualify for certain applications, including extrusion coating application, ethylene copolymers are required to have a certain degree of such long-chain branching. The presence of such long-chain branching is understood to contribute to the desired melt processing properties. Accordingly, it is preferred that the ethylene copolymers according to the present invention are prepared via a high-pressure free-radical polymerisation process. The pressure in such high-pressure free-radical polymerisation process preferably is in the range of ≥180 MPa and ≤350 MPa, preferably ≥200 MPa and ≤300 MPa. The temperature in such high-pressure free-radical polymerisation process preferably is in the range of ≥100 and ≤350° C., preferably ≥150 and ≤310° C.

Such high-pressure free-radical polymerisation process may for example be performed in a tubular reactor. Such tubular reactor may for example be a reactor such as described in Nexant PERP Report 2013-2, 'Low Density Polyethylene', pages 31-48. Such tubular reactor may for example be operated at pressures ranging from 150 to 300 MPa. The tubular reactor may have a tube length of for example ≥1000 m and ≤5000 m. The tubular reactor may for example have a ratio of length to inner diameter of ≥1000:1, alternatively ≥10000:1, alternatively ≥25000:1, such as ≥10000:1 and ≤50000:1, alternatively ≥25000:1 and ≤35000:1. The residence time in the tubular reactor may for example be ≥30 s and ≤300 s, alternatively ≥60 s and ≤200 s. Such tubular reactors may for example have an inner tubular diameter of ≥0.01 m and ≤0.20 m, alternatively ≥0.05 m and ≤0.15 m. The tubular reactor may for example have one or more inlet(s) and one or more outlet(s). The feed composition may for example be fed to the tubular reactor at the inlet of the tubular reactor. The stream that exits the tubular reactor from the outlet may for example comprise the ethylene copolymer. The stream that exits the tubular reactor from the outlet may for example comprise unreacted feed composition. Such unreacted feed compositions may be recycled back into the tubular reactor via one or more inlet.

In a further embodiment, the invention relates to a process for production of ethylene copolymers in a tubular reactor wherein:
the process is performed at a pressure of ≥200 and ≤350 MPa, and a temperature of ≥100 and ≤350° C.;
the process is performed in the presence of one or more free-radical initiator selected from organic peroxides and/or azo compounds;

a mixture of reactants is introduced into the reactor comprising:
(a) ≥72.5 and ≤99.9 mol % ethylene;
(b) ≥0.1 and ≤25.0 mol % of a comonomer A according to formula (III):

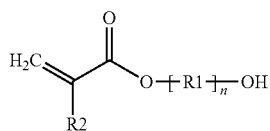

Formula (III)

wherein
R1 is a moiety selected from the group consisting of:
—CH$_2$—;
—[CH$_2$]$_x$—CH(CH$_3$)—, wherein x≥1 and ≤10;
—CH$_2$—CHR4-[O—CH$_2$—CHR4]$_q$—, wherein q≥1 and ≤10, and each R4 individually is selected from CH$_3$ and H; and
—CH$_2$—CH(OH)—CH$_2$—;
n≥1 and ≤10; and
R2 is selected from —H or —CH$_3$;
(c) ≥0.01 and ≤2.5 mol % of a comonomer B according to formula (IV):

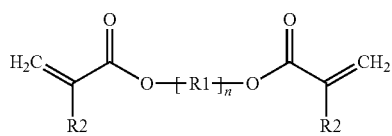

Formula (IV)

wherein
R1 is a moiety selected from the group consisting of:
—CH$_2$—;
—[CH$_2$]$_x$—CH(CH$_3$)—, wherein x≥1 and ≤10;
—CH$_2$—CHR4-[O—CH$_2$—CHR4]$_q$—, wherein q≥1 and ≤10, and each R4 individually is selected from CH$_3$ and H; and
—CH$_2$—CH(OH)—CH$_2$—;
n≥1 and ≤10; and
each R2 may individually be selected from —H or —CH$_3$;
with regard to the total molar quantity of the mixture of reactants;
the mol % of each of (a), (b) and (c) being related to the sum of the mol % of (a), (b) and (c), the sum of the mol % of (a), (b) and (c) adding up to 100 mol %.

Preferably, the mixture of reactants comprises:
(a) ≥83.5 and ≤99.45, more preferably ≥94.5 and ≤98.90, mol % ethylene;
(b) ≥0.5 and ≤15.0, more preferably ≥1.0 and ≤5.0, mol % of a comonomer A according to formula (III); and
(c) ≥0.05 and ≤1.5, more preferably ≥0.10 and ≤0.5, mol % of a comonomer B according to formula (IV)
with regard to the total molar quantity of the mixture of reactants; the mol % of each of (a), (b) and (c) being related to the sum of the mol % of (a), (b) and (c), the sum of the mol % of (a), (b) and (c) adding up to 100 mol %.

In such process, comonomer A is understood to act as comonomer from which hydroxyl groups are incorporated into the polymer structure of the ethylene copolymer. Comonomer B is understood to act as a crosslinking agent.

The use of such comonomers also contributes to a reduction of the formation of waxes, which is desirable from the perspective of stable and continuous operation of the polymerisation process, by reducing the accumulation of such waxes in the process equipment.

It is preferred that in the process for production of the ethylene copolymers according to the present invention, comonomer A is selected from 2-hydroxyethyl methacrylate, poly(ethylene glycol) monomethacrylate, and poly(propylene glycol) monomethacrylate, and comonomer B is selected from 1,4-butanediol dimethacrylate, poly(ethylene glycol) dimethacrylate and poly(propylene glycol) dimethacrylate).

The polymerisation process may for example be performed in the presence of an initiator. Such initiator may for example be an initiator composition comprising one or more selected from organic peroxides or azo compounds. Suitable organic peroxides may for example include diacyl peroxides, dialkyl peroxides, peroxymonocarbonates, peroxydicarbonates, peroxyketals, peroxyesters, cyclic peroxides, hydroperoxides. Suitable azo compounds may for example include 2,2'-azodi(isobutyronitrile), 2,2'-azodi(2-methylbutyronitrile), 1,1'-azodi(hexahydrobenzonitrile).

Examples of suitable diacyl peroxides are diisobutyryl peroxide, di(3,5,5-trimethylhexanoyl) peroxide, dilauroyl peroxide, didecanoyl peroxide, dibenzoyl peroxide.

Examples of suitable dialkyl peroxides are dicumyl peroxide, di(tert-butylperoxyisopropyl)benzene, 2,5-dimethyl-2,5-di(tert-butylperoxy)hexane, tert-butyl cumyl peroxide, 2,5-dimethyl-2,5-di(tert-butylperoxy)hexyne, di-tert-butyl peroxide, di-isononanoyl peroxide, di-tert-amyl peroxide, didecanoyl peroxide.

Examples of suitable peroxymonocarbonates are tert-amylperoxy 2-ethylhexyl carbonate, tert-butylperoxy isopropyl carbonate, tert-butylperoxy 2-ethylhexyl carbonate.

Examples of suitable peroxydicarbonates are di(3-methoxybutyl)peroxydicarbonate, di-sec-butyl peroxydicarbonate, diisopropyl peroxydicarbonate, di(4-tert-butylcyclohexyl) peroxydicarbonate, di(2-ethylhexyl) peroxydicarbonate, dibutyl peroxydicarbonate, diacetyl peroxy dicarbonate, dimyristyl peroxydicarbonate, dicyclohexyl peroxydicarbonate.

Examples of suitable peroxyketals are 1,1-di(tert-butyl peroxy)-3,5,5-trimethylcyclohexane, 1,1-di(tert-amyl peroxy)cyclohexane, 1,1-di(tert-butyl peroxy)cyclohexane, 2,2-di(tert-butyl peroxy)butane, butyl 4,4-di(tert-butyl peroxy)valerate, n-ethyl-4,4-di-(tert-butylperoxy)valerate, ethyl-3,3-di(tert-butylperoxy)butyrate, ethyl-3,3-di(tert-amylperoxy)butyrate.

Examples of suitable peroxyesters are cumyl peroxyneodecanoate, 1,1,3,3,-tetramethylbutylperoxyneodecanoate, cumyl peroxyneoheptanoate, tert-amyl peroxyneodecanoate, tert-butyl peroxyneodecanoate, tert-butyl peroxyisononanoate, tert-butyl permaleate, tert-butyl peroxydiethylisobutyrate, 1,1,3,3-tetramethylbutyl peroxypivalate, tert-butyl peroxyneoheptanoate, tert-amyl peroxypivalate, tert-butyl peroxypivalate, 2,5-dimethyl-2,5-di(2-ethylhexanoylperoxy)hexane, 1,1,3,3-tetramethylbutyl peroxy-2-ethylhexanoate, tert-amyl peroxy-2-ethylhexanoate, tert-butyl peroxy-2-ethyl hexanoate, tert-butyl peroxydiethylacetate, tert-butyl peroxyisobutyrate, tert-amyl peroxyacetate, tert-butyl peroxy-3,5,5-trimethylhexanoate, tert-amyl peroxybenzoate, tert-butyl peroxyacetate, tert-butyl peroxybenzoate.

Examples of suitable cyclic peroxides are 3,6,9-triethyl-3,6,9-trimethyl-1,4,7-triperoxononane, 3,3,5,7,7-pentamethyl-1,2,4-trioxepane, 3,3,6,6,9,9,-hexamethyl-1,2,4,5-tetraoxacyclononane.

Examples of suitable hydroperoxides are isopropylcumyl hydroperoxide, 1,1,3,3-tetramethylbutyl hydroperoxide, cumyl hydroperoxide, tert-butyl hydroperoxide, tert-amyl hydroperoxide, methyl isobutyl ketone hydroperoxide, diisopropyl hydroxyperoxide.

In an embodiment, the free radical initiator composition may for example comprise 2,5-dimethyl-2,5-di(tert-butylperoxy)hexane, tert-butyl peroxypivalate and/or t-butyl peroxy benzoate.

Such initiators may for example be fed to the tubular reactor in a pure form or as a solution in a solvent. As solvent, for example a $C_2$-$C_{20}$ normal paraffin or $C_2$-$C_{20}$ isoparaffin may be used. For example, such solution may comprise ≥2.0% and ≤65.0% by weight of initiator, alternatively ≥5.0% and ≤40.0% by weight, alternatively ≥10.0% and ≤30.0% by weight, compared to the total weight of the solution.

Such initiators may for example be introduced into the polymerisation reactor in quantities of ≤300 ppm, preferably ≤200 ppm, compared to the total weight of the materials fed to the polymerisation reactor.

In addition, further modifiers may be fed to the tubular reactor. Examples of such modifiers may include inhibitors, scavengers and/or chain transfer agents, such as alcohols, aldehydes, ketones and aliphatic hydrocarbons. Such modifiers may for example be fed to the tubular reactor in a pure form or as a solution in a solvent.

Examples of suitable chain transfer agents include cyclopropane, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichlorethane, acetonitrile, N-ethylacetamide, propylene, n-decane, N,N-diethylacetamide, cyclopentane, acetic anhydride, n-tridecane, n-butyl benzoate, isopropanol, toluene, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chloroethane, octene-1,2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1,1,2-dibromoethane, dimethylamine, benzaldehyde, chloroform, 2-ethylhexene-1, propionaldehyde, 1,4-dichlorobutene-2, tri-n-butylphosphine, dimethylphosphine, methyl cyanoacetate, carbon tetrachloride, bromotrichloromethane, di-n-butylphosphine, acetaldehyde, hydrogen and phosphine.

Preferably, the polymerization is performed in the presence of a chain transfer agent selected from the group consisting of propionaldehyde, n-heptane, propane, isopropanol and acetone.

In a further preferred embodiment, the present invention relates to a process for production of ethylene copolymers in a tubular reactor wherein:

the process is performed at a pressure of ≥200 and ≤350 MPa, and a temperature of ≥100 and ≤350° C.;

the process is performed in the presence of one or more free-radical initiator comprising t-butyl peroxy pivalate;

a mixture of reactants is introduced into the reactor comprising:
(a) ≥72.5 and ≤99.9 mol % ethylene;
(b) ≥0.10 and ≤25.0 mol % of a comonomer A selected from 2-hydroxyethyl methacrylate, poly(ethylene glycol) monomethacrylate, and poly(propylene glycol) monomethacrylate
(c) ≥0.01 and ≤2.5 mol % of a comonomer B selected from 1,4-butanediol dimethacrylate, poly(ethylene glycol) dimethacrylate and poly(propylene glycol di methacrylate);
the mol % of each of (a), (b) and (c) being related to the sum of the mol % of (a), (b) and (c), the sum of the mol % of (a), (b) and (c) adding up to 100 mol %;

wherein further a quantity of a chain transfer agent selected from the group consisting of propionaldehyde, n-heptane, propane, isopropanol and acetone is fed to the tubular reactor.

In another preferred embodiment, the present invention relates to a process for production of ethylene copolymers in a tubular reactor wherein:

the process is performed at a pressure of ≥200 and ≤350 MPa, and a temperature of ≥100 and ≤350° C.;

the process is performed in the presence of one or more free-radical initiator selected from organic peroxides and/or azo compounds;

a mixture of reactants is introduced into the reactor comprising:
(a) ≥78.0 and ≤99.9 mol % ethylene;
(b) ≥0.1 and ≤20.0 mol % of a comonomer A according to formula (III):

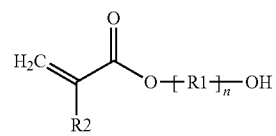

Formula (III)

wherein
R1 is a moiety selected from the group consisting of:
—$CH_2$—;
—$[CH_2]_x$—$CH(CH_3)$—, wherein x≥1 and ≤10;
—$CH_2$—$CHR4$-[O—$CH_2$—$CHR4]_q$—, wherein q≥1 and ≤10, and each R4 individually is selected from $CH_3$ and H; and
—$CH_2$—$CH(OH)$—$CH_2$—;
n≥1 and ≤10; and
R2 is selected from —H or —$CH_3$;
(c) ≥0.01 and ≤2.0 mol % of a comonomer B according to formula (IV):

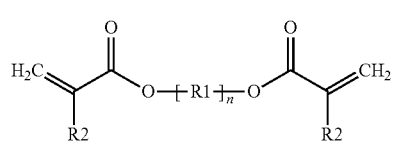

Formula (IV)

wherein
R1 is a moiety selected from the group consisting of:
—CH$_2$—;
—[CH$_2$]$_x$—CH(CH$_3$)—, wherein x≥1 and ≤10;
—CH$_2$—CHR4-[O—CH$_2$—CHR4]$_q$—, wherein q≥1 and ≤10, and each R4 individually is selected from CH$_3$ and H; and
—CH$_2$—CH(OH)—CH$_2$—;
n≥1 and ≤10; and
each R2 may individually be selected from —H or —CH$_3$;

with regard to the total molar quantity of the mixture of reactants;
the mol % of each of (a), (b) and (c) being related to the sum of the mol % of (a), (b) and (c), the sum of the mol % of (a), (b) and (c) adding up to 100 mol %.

The invention further relates to the use of an ethylene copolymer according to the invention or produced according to the invention in the production of extrusion coated articles, films, foams, adhesives, bitumen modifiers, moulded articles, 3D printed articles and/or polymer alloys. Also, the invention relate to articles comprising an ethylene copolymer according to the invention or produced according to the process according to the invention wherein the article is an extrusion coated article, a film, a foam, an adhesive, a bitumen modifier, a moulded article, a 3D printed article or a polymer alloy.

The invention will now be illustrated by the following non-limiting examples.

EXAMPLES

The materials listed below were used as comonomers in the examples.

| | |
|---|---|
| HEMA | 2-hydroxyethyl methacrylate, CAS registry nr. 868-77-9 |
| BDDMA | 1,4-butanediol dimethacrylate, CAS registry nr. 2082-81-7 |
| PPGMA | poly(propyleneglycol) monomethacrylate, CAS registry nr. 39420-45-6, having a number average molecular weight of 375 g/mol |
| PEGMA | poly(ethyleneglycol) monomethacrylate, CAS registry nr. 25736-86-1, having a number average molecular weight of 360 g/mol |
| PEGDMA | poly(ethylene glycol) dimethacrylate, CAS registry nr. 25852-47-5, having a number average molecular weight of 550 g/mol |
| PPGDMA | poly(propylene glycol) dimethacrylate, CAS registry nr. 25852-49-7, having a number average molecular weight of 560 g/mol |
| DVB | Divinylbenzene CAS registry nr 1321-74-0, having a number average molecular weight of 130 g/mol |

Preparation of Ethylene Copolymers

In a high-pressure stirred autoclave polymerisation reactor, ethylene copolymers were prepared by reacting a feed mixture comprising ethylene and an amount of comonomer as presented in table I. In addition, a quantity of 1.40 mol % of isopropanol with regard to the molar quantity of ethylene was fed. In examples IV-IX, a further quantity of 0.058 mol % propionaldehyde with regard to the molar quantity of ethylene was fed.

The reaction was performed at a pressure of 200 MPa. The reaction was initiated by addition of a 4.0 g/l solution of t-butyl peroxy pivalate (t-BPP) in heptane, in quantities as indicated in Table I, t-BPP or t-BPB was fed in such quantity as to reach the desired. The reaction temperature was kept between at the temperature in ° C. as indicated in Table I. The average residence time in all examples was 45 s. The obtained ethylene polymer was collected.

TABLE I

| Example | Ethylene | Comonomer A | Comonomer B | t-BPP | t-BPB | Temperature |
|---|---|---|---|---|---|---|
| I | 99.29 | 0.70 HEMA | 0.010 BDDMA | 0.0010 | | 200 |
| II | 99.28 | 0.70 HEMA | 0.020 BDDMA | 0.0014 | | 215 |
| III | 99.29 | 0.70 HEMA | 0.010 BDDMA | 0.0023 | | 220 |
| IV | 99.79 | 0.20 PPGMA | 0.012 PPGDMA | 0.0004 | | 200 |
| V | 99.79 | 0.20 PPGMA | 0.012 PPGDMA | 0.0013 | | 220 |
| VI | 99.79 | 0.20 PEGMA | 0.012 PEGDMA | 0.0007 | | 200 |
| VII | 99.79 | 0.20 PEGMA | 0.012 PEGDMA | 0.0009 | | 220 |
| VIII | 99.26 | 0.70 PEGMA | 0.042 PEGDMA | 0.0024 | | 200 |
| IX | 99.26 | 0.70 PEGMA | 0.042 PEGDMA | 0.0035 | | 220 |
| X (C) | 99.80 | 0.20 HEMA | | 0.0005 | | 220 |
| XI (C) | 99.30 | 0.70 HEMA | | 0.0008 | | 220 |
| XII (C) | 100.00 | No comonomer | | 0.0004 | | 220 |
| XIII | 99.9 | 0.10 HEMA | 0.049 DVB | 0.0069 | | 220 |
| XIV | 99.80 | 0.20 HEMA | 0.021 DVB | | 0.0014 | 230 |
| XV | 99.80 | 0.20 HEMA | 0.051 DVB | | 0.0040 | 230 |
| XVI | 99.30 | 0.70 HEMA | 0.020 DVB | | 0.0015 | 230 |

The quantities of comonomer A, comonomer B and ethylene are expressed as molar fraction of the sum of comonomer A, comonomer B and ethylene, in mol %, the total adding up to 100 mol %.

The quantities of t-butyl peroxy pivalate (t-BPP) and t-butyl peroxy benzoate (t-BPB) are expressed as mol % with regard to the molar quantity of ethylene.

Examples X, XI and XII were presented for comparative purposes.

Properties of the Ethylene Copolymers

For each of the ethylene copolymers that were prepared using the feed mixtures and polymerisation conditions as presented in Table I, the material properties were determined as presented below in Table II.

TABLE II

| Example | Com. A (mol %) | Com. B (mol %) | C2 (mol %) | MFR (g/10 min) | Conversion (%) | $T_m$ (° C.) | $\Delta H_F$ |
|---|---|---|---|---|---|---|---|
| I | 5.46 | 0.16 | 94.4 | 22.9 | 12.7 | 99 | 97 |
| II | 5.67 | 0.08 | 94.3 | 40.0 | 12.3 | | |
| III | 5.25 | 0.08 | 94.7 | 91.8 | 13.2 | 97 | 95 |
| IV | 1.23 | 0.07 | 98.7 | 14.0 | 11.5 | 109 | 114 |
| V | 1.04 | 0.06 | 98.9 | 55.0 | 13.6 | 107 | 115 |
| VI | 1.32 | 0.08 | 98.6 | 4.90 | 11.9 | 110 | 113 |
| VII | 1.42 | 0.08 | 98.5 | 16.0 | 12.3 | 108 | 111 |
| VIII | 3.58 | 0.22 | 96.2 | 0.37 | 12.8 | 97 | 52 |
| IX | 4.34 | 0.26 | 95.4 | 3.30 | 16.8 | 97 | 55 |
| X (C) | 1.25 | | 98.7 | 6.69 | 15.9 | 109 | 140 |
| XI (C) | 3.7 | | 96.3 | 145 | 18.6 | 100 | 97 |
| XII (C) | | | 100.0 | 5.20 | 14.5 | 114 | 150 |
| XIII | 1.03 | 0.50 | 98.47 | 0.01 | 9.7 | | |
| XIV | 1.70 | 0.18 | 98.12 | 0.38 | 11.7 | | |
| XV | 1.86 | 0.47 | 97.67 | 0.01 | 10.7 | | |
| XVI | 5.26 | 0.15 | 94.59 | 19.0 | 13.2 | | | wherein:

the content of recurring units derived from comonomer A and from comonomer B is determined via NMR, wherein the sample is dissolved in deuterated tetrachloroethane at 120° C. The NMR spectra is recorded with a Bruker Avance 500 NMR spectrometer equipped with a 10 mm diameter cryo-cooled probe head, operating at 125° C., to obtain both $^1$H-NMR and $^{13}$C-NMR spectra, measuring time $^{13}$C-NMR 3 hrs, $^1$H-NMR 30 min.

Com. A: The quantity of recurring units derived from comonomer A in mol %, as determined via NMR according to the method presented above;

Com. B: The quantity of recurring units derived from comonomer B in mol %, as determined via NMR according to the method presented above;

C2: The quantity of recurring units derived from ethylene in mol %, as determined via NMR according to the method presented above;

The quantities of recurring units derived from comonomer A, comonomer B and ethylene are expressed as molar fraction of the sum of units derived from comonomer A, comonomer B and ethylene, the total adding up to 100 mol %.

MFR: Melt mass-flow rate in g/10 min as determined in accordance with ISO 1133-1 (2011), at 190° C. under a load of 2.16 kg.

$T_m$ is the peak melting temperature in ° C. as determined via differential scanning calorimetry (DSC) according to ISO 11357-3 (2011) using a NETZSCH DSC 200PC differential scanning calorimeter.

$\Delta H_F$ is the enthalpy of fusion of the melting peak in J/g as determined according to ISO 11357-3 (2011) using a NETZSCH DSC 200PC differential scanning calorimeter.

The examples show that ethylene copolymers according to the present invention have a reduced peak melting temperature and reduced enthalpy of fusion, indicating that these ethylene copolymers have a reduced degree of crystallinity combined with a desired melt mass-flow rate.

The invention claimed is:

1. Ethylene copolymer comprising:
(i) ≥78.0 and ≤99.9 mol % of recurring units derived from ethylene;
(ii) ≥0.10 and ≤20.0 mol % of recurring units derived from a comonomer A according to formula (I):

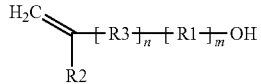

Formula (I)

wherein
R1 is a moiety selected from the group consisting of:
—CH$_2$—;
—[CH$_2$]$_x$—CH(CH$_3$)—, wherein x≥1 and ≤10;
—CH$_2$—CHR4-[O—CH$_2$—CHR4]$_q$—, wherein q≥1 and ≤10, and each R4 individually is selected from CH$_3$ or H; and
—CH$_2$—CH(OH)—CH$_2$—;
R2 is selected from —H or —CH$_3$;
R3 is selected from —O—, —(CO)—(NH)— or —(CO)—O—;
n=0 or 1; and m≥1 and ≤10; and
(iii) ≥0.01 and ≤2.00 mol % of recurring units derived from a comonomer B according to formula (II):

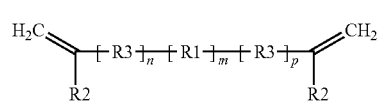

Formula (II)

wherein
R1 is a moiety selected from the group consisting of:
—CH$_2$—;
—[CH$_2$]$_x$—CH(CH$_3$)—, wherein x≥1 and ≤10;
—CH$_2$—CHR4-[O—CH$_2$—CHR4]$_q$—, wherein q≥1 and ≤10, and each R4 individually is selected from CH$_3$ or H; and
—CH$_2$—CH(OH)—CH$_2$—;
each R2 may individually be selected from —H or —CH$_3$;
each of R3 is individually selected from —O—, —(CO)—(NH)— or —(CO)—O—;
n=0 or 1; p=0 or 1; and m≥1 and ≤10;
the mol % of each of (i), (ii) and (iii) being related to the sum of the mol % of (i), (ii) and (iii), the sum of the mol % of (i), (ii) and (iii) adding up to 100 mol %.

2. Ethylene copolymer according to claim 1, wherein the comonomer A is a compound according to formula (III):

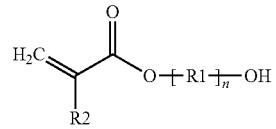

Formula (III)

wherein
R1 is a moiety selected from the group consisting of:
—CH$_2$—;
—[CH$_2$]$_x$—CH(CH$_3$)—, wherein x≥1 and ≤10;
—CH$_2$—CHR4-[O—CH$_2$—CHR4]$_q$—, wherein q≥1 and ≤10, and each R4 individually is selected from CH$_3$ or H; and
—CH$_2$—CH(OH)—CH$_2$—;
n≥1 and ≤10; and
R2 is selected from —H or —CH$_3$.

3. Ethylene copolymer according to claim 1, wherein the comonomer B is a compound according to formula (IV):

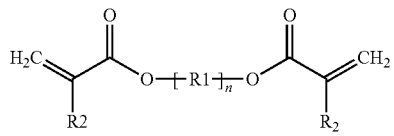

Formula (IV)

wherein
R1 is a moiety selected from the group consisting of:
—CH$_2$—;
—[CH$_2$]$_x$—CH(CH$_3$)—, wherein x≥1 and ≤10;
—CH$_2$—CHR4-[O—CH$_2$—CHR4]$_q$—, wherein q≥1 and ≤10, and each R4 individually is selected from CH$_3$ or H; and
—CH$_2$—CH(OH)—CH$_2$—;
n≥1 and ≤10; and
each R2 may individually be selected from —H or —CH$_3$.

4. Ethylene copolymer according to claim 1 wherein:
comonomer A is a compound selected from the group consisting of 2-hydroxyethyl acrylate, 2-hydroxyethyl methacrylate, 3-hydroxypropyl acrylate, 3-hydroxypropyl methacrylate, 2-hydroxypropyl acrylate, 2-hydroxypropyl methacrylate, 2,3-dihydroxypropyl acrylate, 2,3-dihydroxypropyl methacrylate, 4-hydroxybutyl acrylate, 4-hydroxybutyl methacrylate, poly(propylene glycol) monoacrylate, poly(propyleneglycol) monomethacrylate, poly(ethylene glycol) monoacrylate, poly(ethylene glycol) monomethacrylate, poly(ethylenepropyleneglycol) monomethacrylate and 2-hydroxyethyl vinyl ether; and/or
comonomer B is a compound selected from the group consisting of 1,4-butanediol dimethacrylate, hexanediol dimethacrylate, ethylene glycol dimethacrylate, 1,3-butylene glycol dimethacrylate, glycerol dimethacrylate, 1,4-butanediol diacrylate, hexanediol diacrylate, ethylene glycol diacrylate, 1,3-butylene glycol diacrylate, glycerol diacrylate, glycerol 1,3-diglycerolate diacrylate, glycerol 1,3-diglycerolate dimethacrylate, poly(ethylene glycol) dimethacrylate, poly(propylene glycol) dimethacrylate, poly (ethylenepropyleneglycol) dimethacrylate, 1,4-butanediol divinyl ether, poly(ethylene glycol) divinyl ether, di(ethyleneglycol) divinyl ether, 1,5-hexadiene, 1,7-octadiene, 1,9-decadiene and 1,13-tetradecadiene.

5. Ethylene copolymer according to claim 1 wherein the copolymer comprises
(i) ≥78.0 and ≤99.9 mol % of recurring units derived from ethylene;
(ii) ≥0.10 and ≤20.0 mol % of recurring units derived from comonomer A wherein comonomer A is selected from the group consisting of 2-hydroxyethyl acrylate, 2-hydroxyethyl methacrylate, 3-hydroxypropyl acrylate, 3-hydroxypropyl methacrylate, 2-hydroxypropyl acrylate, 2-hydroxypropyl methacrylate, poly(propyleneglycol) monomethacrylate, poly(ethylene glycol) acrylate, poly(ethylene glycol) methacrylate and poly (ethylenepropyleneglycol) monomethacrylate; and
(iii) ≥0.01 and ≤2.00 mol % of recurring units derived from comonomer B wherein comonomer B is selected from the group consisting of 1,4-butanediol dimethacrylate, hexanediol dimethacrylate, 1,3-butylene glycol dimethacrylate, dodecanediol dimethacrylate, glycerol dimethacrylate, 1,4-butanediol diacrylate, hexanediol diacrylate, 1,3-butylene glycol diacrylate, dodecanediol diacrylate, poly(ethylene glycol) dimethacrylate, and poly(propylene glycol) dimethacrylate;
the mol % of each of (i), (ii) and (iii) being related to the sum of the mol % of (i), (ii) and (iii), the sum of the mol % of (i), (ii) and (iii) adding up to 100 mol %.

6. Ethylene copolymer according to claim 1, wherein the ethylene copolymer has a melt mass-flow rate as determined in accordance with ISO 1133-1 (2011), at a temperature of 190° C. and a load of 2.16 kg, of ≥0.1 and ≤150.0 g/10 min.

7. Ethylene copolymer according to claim 1, wherein the ethylene copolymer has a peak melting temperature as determined according to ISO 11357-3 (2011) of ≤110° C. and a enthalpy of fusion of the melting peak as determined according to ISO 11357-3 (2011) of ≤120 J/g.

8. Ethylene copolymer according to claim 1, wherein the ethylene copolymer is produced in a tubular reactor.

9. Process for production of ethylene copolymers according to claim 1 in a tubular reactor wherein:
the process is performed at a pressure of ≥200 and ≤350 MPa, and a temperature of ≥100 and ≤350° C.;
the process is performed in the presence of one or more free-radical initiator selected from organic peroxides and/or azo compounds;
a mixture of reactants is introduced into the reactor comprising:
(a) ≥78.0 and ≤99.9 mol % ethylene;
(b) ≥0.1 and ≤20.0 mol % of a comonomer A according to formula (III):

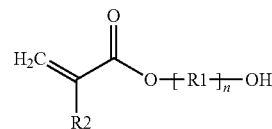

Formula (III)

wherein
R1 is a moiety selected from the group consisting of:
—CH$_2$—;
—[CH$_2$]$_x$—CH(CH$_3$)—, wherein x≥1 and ≤10;
—CH$_2$—CHR4-[O—CH$_2$—CHR4]$_q$—, wherein q≥1 and ≤10, and each R4 individually is selected from CH$_3$ or H; and
—CH$_2$—CH(OH)—CH$_2$—;
n≥1 and ≤10; and
R2 is selected from —H or —CH$_3$;
(c) ≥0.01 and ≤2.0 mol % of a comonomer B according to formula (IV):

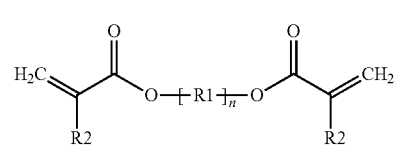

Formula (IV)

wherein
R1 is a moiety selected from the group consisting of:
—CH$_2$—;
—[CH$_2$]$_x$—CH(CH$_3$)—, wherein x≥1 and ≤10;

—CH$_2$—CHR4-[O—CH$_2$—CHR4]$_q$—, wherein q≥1 and ≤10, and each R4 individually is selected from CH$_3$ and H; and

—CH$_2$—CH(OH)—CH$_2$—;

n≥1 and ≤10; and each R2 may individually be selected from —H or —CH$_3$;

with regard to the total molar quantity of the mixture of reactants;

the mol % of each of (a), (b) and (c) being related to the sum of the mol % of (a), (b) and (c), the sum of the mol % of (a), (b) and (c) adding up to 100 mol %.

10. Process according to claim 9 wherein comonomer A is selected from 2-hydroxyethyl methacrylate, poly(ethylene glycol) monomethacrylate, or poly(propylene glycol) monomethacrylate; and comonomer B is selected from 1,4-butanediol dimethacrylate, poly(ethylene glycol) dimethacrylate, or poly(propylene glycol) dimethacrylate.

11. Ethylene copolymer comprising:

(i) ≥78.0 and ≤99.9 mol % of recurring units derived from ethylene;

(ii) ≥0.10 and ≤20.0 mol % of recurring units derived from a comonomer A according to formula (I):

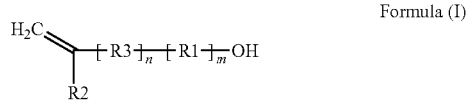

Formula (I)

wherein R1 is a moiety comprising 1 to 30 carbon atoms;

R2 is selected from —H or —CH$_3$;

R3 is selected from —O—, —(CO)—(NH)— or —(CO)—O—;

n=0 or 1; and m≥1 and ≤10; and (iii) ≥0.01 and ≤2.00 mol % of recurring units derived from a comonomer B according to formula (II):

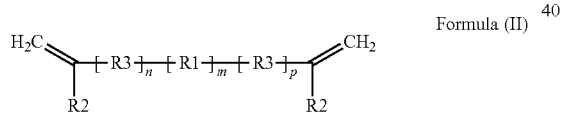

Formula (II)

wherein

R1 is a moiety comprising 1 to 30 carbon atoms;

each R2 may individually be selected from —H or —CH$_3$;

each of R3 is individually selected from —O—, —(CO)—(NH)— or —(CO)—O—;

n=0 or 1; p=0 or 1; and m≥1 and ≤10;

the mol % of each of (i), (ii) and (iii) being related to the sum of the mol % of (i), (ii) and (iii), the sum of the mol % of (i), (ii) and (iii) adding up to 100 mol %;

wherein the molar ratio of the recurring units derived from comonomer A to the recurring units derived from comonomer B is ≥10 and ≤100.

12. Ethylene copolymer according to claim 11, wherein in formula (I):

R1 is a moiety selected from the group consisting of:

—CH$_2$—;

—[CH$_2$]$_x$—CH(CH$_3$)—, wherein x≥1 and ≤10;

—CH$_2$—CHR4-[O—CH$_2$—CHR4]$_q$—, wherein q≥1 and ≤10, and each R4 individually is selected from CH$_3$ or H; and —CH$_2$—CH(OH)—CH$_2$—; and in formula (II):

R1 is a moiety selected from the group consisting of:

—CH$_2$—;

—[CH$_2$]$_x$—CH(CH$_3$)—, wherein x≥1 and ≤10;

—CH$_2$—CHR4-[O—CH$_2$—CHR4]$_q$—, wherein q≥1 and ≤10, and each R4 individually is selected from CH$_3$ or H; and

—CH$_2$—CH(OH)—CH$_2$—.

13. Ethylene copolymer according to claim 11, wherein the comonomer A is a compound according to formula (III):

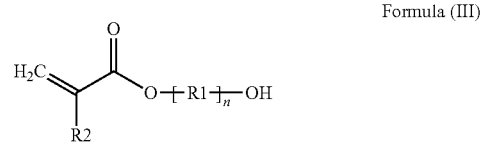

Formula (III)

wherein

R1 is a moiety selected from the group consisting of:

—CH$_2$—;

—[CH$_2$]$_x$—CH(CH$_3$)—, wherein x≥1 and ≤10;

—CH$_2$—CHR4-[O—CH$_2$—CHR4]$_q$—, wherein q≥1 and ≤10, and each R4 individually is selected from CH$_3$ or H; and

—CH$_2$—CH(OH)—CH$_2$—;

n≥1 and ≤10; and

R2 is selected from —H or —CH$_3$.

14. Ethylene copolymer according to claim 11, wherein the comonomer B is a compound according to formula (IV):

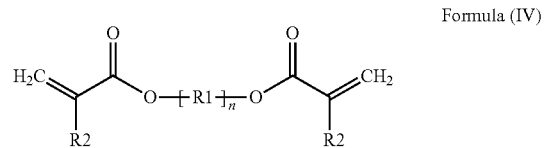

Formula (IV)

wherein

R1 is a moiety selected from the group consisting of:

—CH$_2$—;

—[CH$_2$]$_x$—CH(CH$_3$)—, wherein x≥1 and ≤10;

—CH$_2$—CHR4-[O—CH$_2$—CHR4]$_q$—, wherein q≥1 and ≤10, and each R4 individually is selected from CH$_3$ or H; and

—CH$_2$—CH(OH)—CH$_2$—;

n≥1 and ≤10; and each R2 may individually be selected from —H or —CH$_3$.

15. Ethylene copolymer according to claim 11 wherein:

comonomer A is a compound selected from the group consisting of 2-hydroxyethyl acrylate, 2-hydroxyethyl methacrylate, 3-hydroxypropyl acrylate, 3-hydroxypropyl methacrylate, 2-hydroxypropyl acrylate, 2-hydroxypropyl methacrylate, 2,3-dihydroxypropyl acrylate, 2,3-dihydroxypropyl methacrylate, 4-hydroxybutyl acrylate, 4-hydroxybutyl methacrylate, poly(propylene glycol) monoacrylate, poly(propyleneglycol) monomethacrylate, poly(ethylene glycol) monoacrylate, poly(ethylene glycol) monomethacrylate, poly(ethylenepropyleneglycol) monomethacrylate and 2-hydroxyethyl vinyl ether; and/or comonomer B is a compound selected from the group consisting of 1,4-butanediol dimethacrylate, hexanediol dimethacrylate, ethylene glycol dimethacrylate, 1,3-butylene glycol dimethacrylate, dodecanediol dimethacrylate, glycerol dimethacrylate, 1,4-butanediol diacrylate, hexanediol diacrylate, ethylene glycol diacrylate, 1,3-butylene glycol diacrylate, dodecanediol diacrylate, glycerol diacrylate, glycerol 1,3-diglycerolate diacrylate, glycerol 1,3-diglycerolate dimethacrylate, poly(ethylene glycol) dimethacrylate, poly(propylene glycol) dimethacrylate, poly(ethylenepropyleneglycol) dimethacrylate, 1,4-butanediol divinyl ether, poly(ethylene glycol) divinyl ether, di(ethyleneglycol) divinyl ether, 1,5-hexadiene, 1,7-octadiene, 1,9-decadiene and 1,13-tetradecadiene.

16. Ethylene copolymer according to claim 11 wherein the copolymer comprises
(i) ≥78.0 and ≤99.9 mol % of recurring units derived from ethylene;
(ii) ≥0.10 and ≤20.0 mol % of recurring units derived from comonomer A wherein comonomer A is selected from the group consisting of 2-hydroxyethyl acrylate, 2-hydroxyethyl methacrylate, 3-hydroxypropyl acrylate, 3-hydroxypropyl methacrylate, 2-hydroxypropyl acrylate, 2-hydroxypropyl methacrylate, poly(propyleneglycol) monomethacrylate, poly(ethylene glycol) acrylate, poly(ethylene glycol) methacrylate and poly(ethylenepropyleneglycol) monomethacrylate; and
(iii) ≥0.01 and ≤2.00 mol % of recurring units derived from comonomer B wherein comonomer B is selected from the group consisting of 1,4-butanediol dimethacrylate, hexanediol dimethacrylate, 1,3-butylene glycol dimethacrylate, dodecanediol dimethacrylate, glycerol dimethacrylate, 1,4-butanediol diacrylate, hexanediol diacrylate, 1,3-butylene glycol diacrylate, dodecanediol diacrylate, poly(ethylene glycol) dimethacrylate, and poly(propylene glycol) dimethacrylate;
the mol % of each of (i), (ii) and (iii) being related to the sum of the mol % of (i), (ii) and (iii), the sum of the mol % of (i), (ii) and (iii) adding up to 100 mol %.

17. Article comprising an ethylene copolymer according to claim 11, wherein the article is an extrusion coated article, a film, a foam, an adhesive, a bitumen modifier, a molded article, a 3D printed article or a polymer alloy.

18. An article comprising an ethylene copolymer which comprises:
(i) ≥78.0 and ≤99.9 mol % of recurring units derived from ethylene;
(ii) ≥0.10 and ≤20.0 mol % of recurring units derived from a comonomer A according to formula (I):

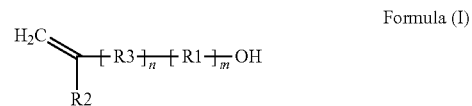

Formula (I)

wherein
R1 is a moiety comprising 1-30 carbon atoms;
R2 is selected from —H or —$CH_3$;
R3 is selected from —O—, —(CO)—(NH)— or —(CO)—O—;
n=0 or 1; and m≥1 and ≤10; and
(iii) ≥0.01 and ≤2.00 mol % of recurring units derived from a comonomer B according to formula (II):

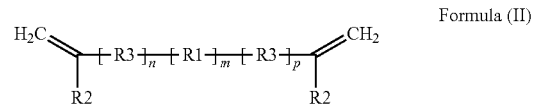

Formula (II)

wherein
R1 is a moiety comprising 1-30 carbon atoms;
each R2 may individually be selected from —H or —$CH_3$;
each of R3 is individually selected from —O—, —(CO)—(NH)— or —(CO)—O—;
n=0 or 1; p=0 or 1; and m≥1 and ≤10;
the mol % of each of (i), (ii) and (iii) being related to the sum of the mol % of (i), (ii) and (iii), the sum of the mol % of (i), (ii) and (iii) adding up to 100 mol %,
wherein the article is an extrusion coated article, a film, a foam, an adhesive, a bitumen modifier, a molded article, a 3D printed article or a polymer alloy.

* * * * *